United States Patent [19]

Hamilton

[11] 4,358,985
[45] Nov. 16, 1982

[54] MAGNETIC HEADING REFERENCE SYSTEM AND GUN POSITION SYSTEM FOR MILITARY VEHICLES

[76] Inventor: Leslie A. Hamilton, 11423 Kirkwyn, Houston, Tex. 77089

[21] Appl. No.: 156,551

[22] Filed: Jun. 5, 1980

[51] Int. Cl.³ .............................................. F41G 5/14
[52] U.S. Cl. .................. 89/41 R; 89/41 ME; 89/41 M; 324/253
[58] Field of Search .............. 89/41 E, 41 ME, 41 M, 89/41 CE, 41 D; 324/207, 208, 225, 233, 253

[56] References Cited

U.S. PATENT DOCUMENTS

| | | | |
|---|---|---|---|
| 769,870 | 9/1904 | Morrison | 324/225 |
| 1,342,475 | 6/1920 | Thompson | 89/41 M |
| 2,550,514 | 4/1951 | Alexanderson | 89/41 M |
| 2,903,945 | 9/1959 | Mann | 89/41 E |
| 3,012,177 | 12/1961 | Mortimer | 324/253 |
| 3,429,222 | 2/1969 | Whiston et al. | 89/41 M |
| 4,005,358 | 1/1977 | Foner | 324/233 |
| 4,116,057 | 9/1978 | Sullivan | 324/225 |
| 4,144,574 | 3/1979 | Chamuel | 324/208 |
| 4,172,409 | 10/1979 | Looss et al. | 89/41 E |

*Primary Examiner*—Sal Cangialosi
*Attorney, Agent, or Firm*—Arnold, White & Durkee

[57] ABSTRACT

The present invention relates to a magnetic heading system which is used with a vehicle having a body which is capable of assuming any magnetic heading and a turret which is mounted on said body and which may be rotated 360 degrees in azimuth independently of the body. A transmitter which is located in the turret provides an indication of the magnetic heading that is not altered by the rotation of the turret.

12 Claims, 5 Drawing Figures

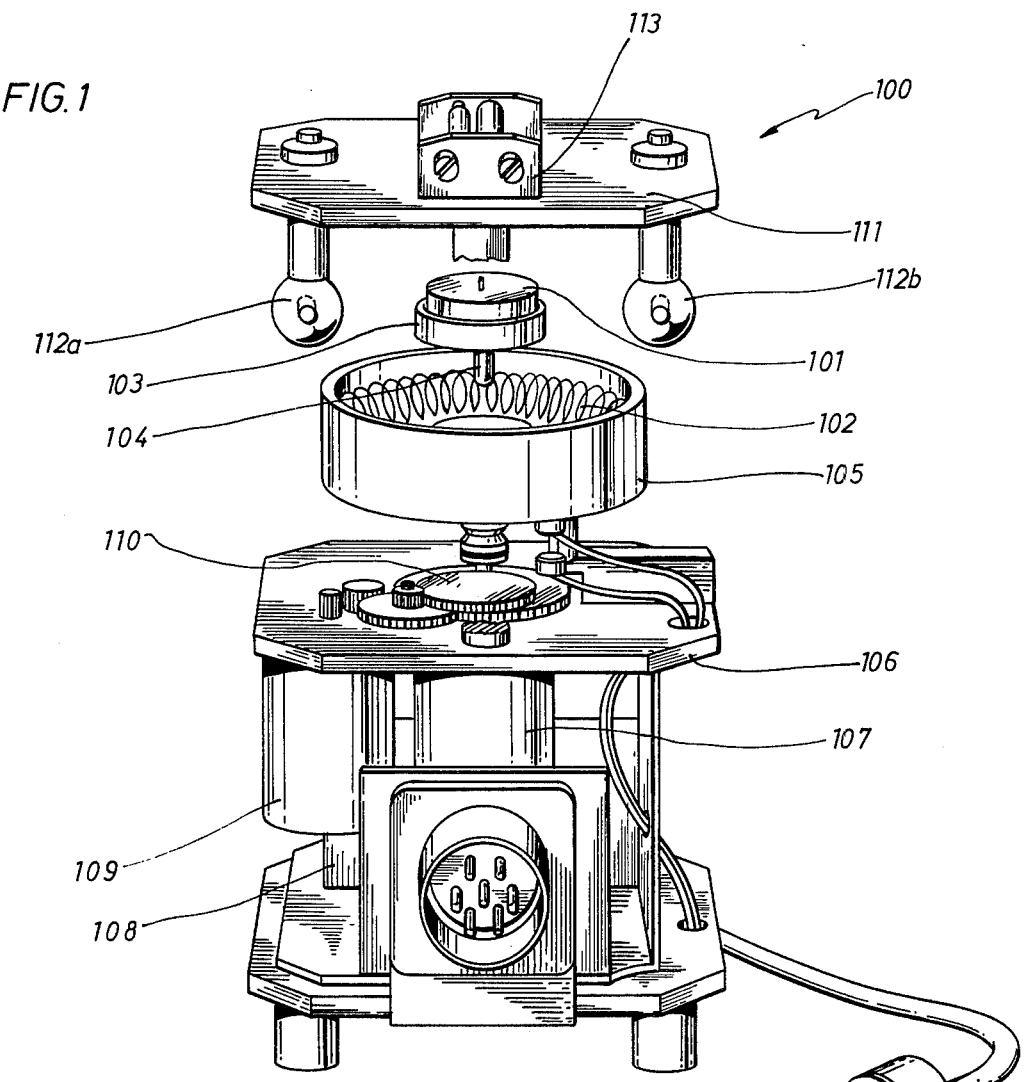
FIG. 1
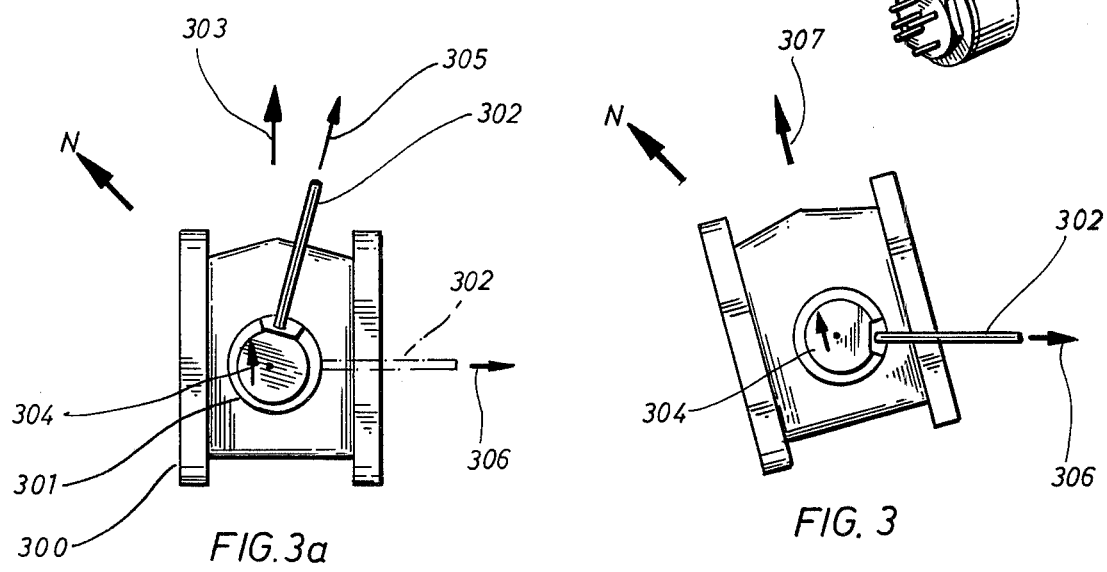
FIG. 3a
FIG. 3

MAGNETIC HEADING REFERENCE SYSTEM AND GUN POSITION SYSTEM FOR MILITARY VEHICLES

FIELD OF THE INVENTION

The present invention relates to a magnetic heading reference system and a gun position system for military vehicles.

BACKGROUND OF THE INVENTION

A need exists and has existed for a substantial period of time for an adequate magnetic heading reference system, i.e., "compass," for use in military vehicles, such as tanks. It is believed that this need was first recognized during World War II as evidenced by a War Department Equipment Board Report dated Janurary 1946.

To provide an adequate compass system for a tank poses special problems due to the extremely high "magnetic signature" of the tank. The magnetic signature may be defined as the aggregate error generated by the total magnetized material in the tank, and the magnitude of the error varies with the relationship of the turret to the body of the tank. If one attempted to use a float-type, self-contained compass (the so-called "wet" compass) in a tank, the magnetic signature of the tank body would cause the compass to produce erroneous heading readings. Further, it is believed that, with a wet compass, it would be virtually impossible to adequately provide compensation for the magnetic signature.

Compass systems for tanks have been proposed which involve obtaining heading information from outside the zone of influence of the magnetic signature and transmitting the heading information to an indicator in the tank. One such system includes a transmitter, which is mounted at the top of a mast, which is connected to the body of the tank. While this technique operates to reduce the effects of the magnetic signature of the tank, it creates other problems. For example, the mast can interfere with firing, especially when located on the front of the tank. Also, the mast is susceptible to being damaged or destroyed through rotation of the turret of the tank with the gun in a lowered position. Moreover, the height of the mast could significantly alter the silhouette of the tank, thereby making it more readily identifiable by the enemy. Thus, this approach has not solved the long-standing problem.

Quite apart from the problem of compensating for the magnetic signature of the tank, a "wet" compass is prone to produce heading errors above and below the seventieth parallels. These type errors are due to the declination of the earth's flux lines as they converge on the magnetic poles.

Tanks typically utilize information received from spotter planes and forward observers to position the gun of the tank to engage targets. Once the tank has fired a round at the target, it is often the case that its location will be observed by enemy spotter planes or enemy forward observers. It is, therefore, advantageous, if not absolutely necessary, for the tank to change its location after firing a round. In order for the tank to be able to engage the same target from its new location, the gun must be repositioned at that new location.

No gun control system for a tank has heretofore been available which continuously maintains the gun aimed in the direction of a given target, regardless of the direction of travel of the tank. The foregoing deficiencies and shortcomings of the prior art have been overcome by the present invention.

SUMMARY OF THE INVENTION

In accordance with the present invention, a transmitter for a magnetic heading system is provided for use with a vehicle having a body which is capable of assuming any magnetic heading and a turret which is mounted on the body and which may be rotated 360 degrees in azimuth independently of the body.

A significant feature of the present invention is that the transmitter is located on the turret of the tank. Moreover, with the present invention, the indication of the magnetic heading of the tank is not altered by rotation of the turret. In other words, with the present invention, the indication of the magnetic heading changes only when the vehicle changes heading, even though the turret might have rotated while the vehicle was travelling at a given heading.

In accordance with an embodiment of the present invention, the transmitter includes sensing means for producing heading information to the indicator in the vehicle. The sensing means include a winding which is movably disposed in the transmitter and which is maintained in alignment with the fore/aft axis of the vehicle at all times. The sensing means further include a magnet to sense the north-south flux lines of the earth. The magnet is movably disposed in the transmitter in the center of the winding, and the position of the magnet with respect to the winding generates information indicative of the heading of the vehicle.

An embodiment of the transmitter of the present invention further includes means for detecting that the turret of the vehicle has rotated with respect to the body of the vehicle. Information based on the detected rotation is used to maintain the winding of the sensing means in alignment with the direction of travel of the vehicle. Thus, the position of the sensing magnet with respect to the winding is not affected by rotation of the turret, and the integrity of the heading information is maintained.

In accordance with the present invention, a gun position controller for a vehicle of the type heretofore described is also provided. This control system is also mounted in the turret of the vehicle. The direction of the gun with respect to magnetic north is displayed on an indicator. As the turret is rotated to bring the gun to a new position, the rotation is detected, and the indicator is changed to display the new direction of the gun. By providing the commander with this information, the gun control system enables the tank commander to maintain magnetic bearing to target, regardless of the magnetic heading of the vehicle itself.

BRIEF DESCRIPTION OF THE DRAWINGS

In the accompanying drawings:

FIG. 1 is an exploded front view of a mechanical configuration of a transmitter in accordance with the present invention.

FIGS. 3 and 3a are pictorial diagrams of a tank which illustrates various aspects of the present invention.

DESCRIPTION OF SPECIFIC EMBODIMENTS

Figure 2:
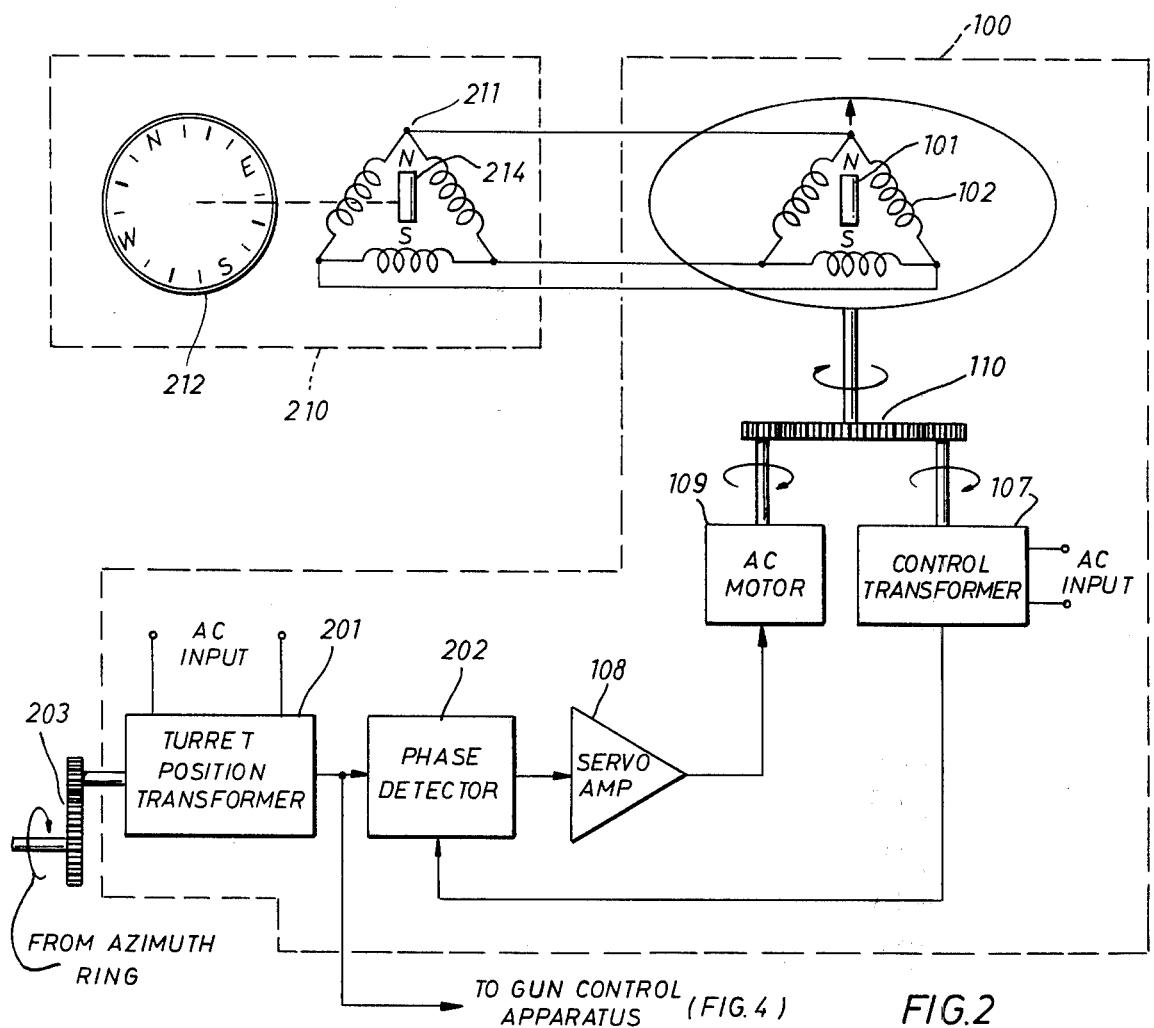
FIG. 2 is a schematic diagram in block diagram form of a portion of the transmitter illustrated in FIG. 1.

It will be appreciated that the present invention can take many forms and embodiments. Some embodiments of the invention are described and illustrated so as to give an understanding of the invention. It is not intended, however, that the illustrative embodiments set forth herein should in any way limit the scope of the invention.

The description of the invention herein is made with respect to military tanks. However, it will be appreciated that the invention may be utilized in any type vehicle having a turret which is rotatable with respect to the body of the vehicle.

With reference to FIG. 1, one mechanical configuration of transmitter 100 in accordance with the present invention is illustrated. Transmitter 100 comprises a magnetic assembly including sensing magnet 101 and damping cup 103. Sensing magnet 101 is mounted on vertical shaft 104, and is free to rotate 360 degrees in azimuth. To minimize friction, shaft 104 is journalled between two precision jewels (not shown) and rests on another jewel (not shown).

Damping cup 103 is a circular metal cut of aluminum or other suitable non-ferrous material, and remains fixed. Damping cup 103 surrounds sensing magnet 101, and approximately one-half of sensing magnet 101 is enclosed by damping cup 103, thereby allowing for a suitable air gap between sensing magnet 101 and damping cup 103. Eddy currents between damping cut 103 and sensing magnet 101 provide the necessary damping to prevent oscillation and overshoot of the magnet when it rotates to sense magnetic north.

Still referring to FIG. 1, transmitter 100 further includes delta winding 102, which is centered slightly below the magnet assembly. Delta winding 102 is enclosed in non-ferrous housing 105, and is journalled on a vertical shaft having suitable slip rings to transmit electronic imputs to the coil and electronic outputs from the coil. Delta coil 102 and housing 105 are able to rotate 360 degrees in azimuth.

Delta winding 102 and the rotating type transformers hereinafter described are preferably activated by the application of a 26-volt, 400-cycle AC input, which is illustrated as "AC input" in the drawings (for example, see FIG. 2). In the case of a tank, that AC input is preferably obtained by converting the 24-volt DC battery voltage of the tank to the specified AC input. Apparatus for making that DC to AC conversion is well known and, accordingly, is not shown or described herein.

Still referring to FIG. 1, a transmitter in accordance with the present invention further includes balancing balls 112a and 112b for neutralizing heavy magnetic errors in the vehicle. Each balancing ball 112a and 112b comprises magnets centered in balls of a suitable non-ferrous material. Balancing balls 112a and 112b are mounted on extended shafts so that compensation is provided in the same azimuth plane as that of sensing magnet 101. Balancing balls 112a and 112b can be adjusted 360 degrees in azimuth by means of screw slots located above the dust cover. The balls are adjusted in conjunction with each other to obtain neutralization of heavy magnetic errors of the vehicle.

After major errors are neutralized, small magnetic errors in the vehicle may be compensated by means of polyplane compensator assembly 113, which comprises two mounted magnets with suitable gearing. As shown in FIG. 1, polyplane compensator assembly 113 is connected to holding plate 111.

Referring now to FIG. 2, sensing magnet 101 is constantly aligned with the earth's magnetic flux lines, since it is free to rotate 360 degrees in azimuth. Sensing magnet 101 maintains its alignment with the earth's magnetic flux lines, regardless of the heading of the tank.

When an AC input is provided to delta winding 102, electronic signals are generated therein and delta winding 102 produces a magnetic field. The magnetic field of delta winding 102 is unbalanced due to the position of sensing magnet 101, and second harmonic voltages are produced in the three legs of delta winding 102. These second harmonic voltages are transmitted to delta winding 211 in indicator 210. The signals in receiver delta coil 211 produce a magnetic field which causes receiver magnet 214 to assume an orientation identical to sensing magnet 101. Compass rose 212 responds to the orientation of receiver magnet 214 to display magnetic heading of the tank. Preferably, indicator 210 is an indicator similar to the type described in U.S. Pat. No. 3,875,676 to Hamilton, the teachings of which patent are incorporated herein by reference.

With reference now to FIG. 3a, suppose that the body 300 of a tank is travelling in the direction indicated by arrow 303 and that magnetic north is in the direction shown. Turret 301 is positioned so that gun 302 is pointed in direction indicated by arrow 305.

Referring now to both FIGS. 2 and 3a, suppose further that a target to be engaged requires the rotation of turret 301 such that gun 302 is pointed in the direction of arrow 306. Prior to this rotation: (1) delta winding 102 is aligned with the direction of travel of the tank as indicated by arrow 304; (2) the output signals from turret position transformer 201 and control transformer 107 are in phase; and (3) AC motor 109 is in an idle state. Turret position transformer 201 and control transformer 107 are rotating-type transformers, whose AC input is provided by the DC-AC converter referred to above.

When the turret rotates to point gun 302 in direction 306, the azimuth ring of the tank rotates, and that rotation is coupled to the input of turret position transformer 201 via gearing 203. At this time, the phase of the signal at the output of turret position transformer 201 is changed and is accordingly out of phase with the signal at the output of control transformer 107. Thus, an error signal based on the phase difference is produced at the output of phase detector 202. That error signal is amplified by servo amp 108, which drives AC motor 109. AC motor 109 via gearing 110 rotates delta winding 102 and housing 105 to keep delta winding 102 aligned with tank body 300. The rotation of AC motor 109 is also transferred to the shaft input of control transformer 107 via gearing 110. The rotation of the shaft input of control transformer 107 operates to change the phase of the output of control transformer 107 to bring it into conformity with the phase of the output of turret position transformer 201. When phase comparison is obtained, rotation of plate 106 ceases.

Those skilled in the art will of course appreciate that correction of the phases of the output signals of turret position transformer 201 and control transformer 107 does not occur instantaneously. However, it would appear to one observing the operation that alignment between delta winding 102 and the body of the vehicle is maintained at all times.

Now suppose that the tank, having fired a round in the direction 306, changes its heading to the direction indicated by arrow 307. In accordance with the present invention, gun position information is provided to enable the tank commander to keep gun 302 positioned on target in direction 306, when the tank assumes that new heading.

Figure 4:
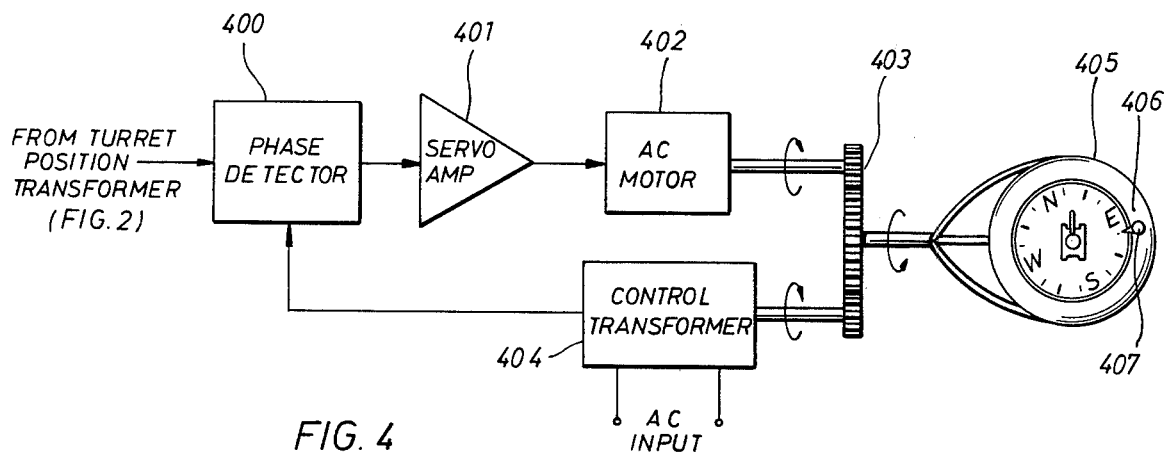
FIG. 4 is a schematic in block diagram form of a gun position controller in accordance with the present invention.

Now referring to FIG. 4, there is illustrated a schematic diagram of a gun position system in accordance with the present invention. As shown, it comprises phase detector 400, servo amp 401, AC motor 402, control transformer 404, and indicator 405, together with suitable gearing 403. When there is no rotation of the turret: (1) the output signals from turret position transformer 201 and control transformer 404 are in phase; and (2) AC motor 402 is in an idle state.

When the tank starts to change its heading from direction 303 to direction 307 (FIG. 3), the phase of the output signal of turret position transformer 201 (FIG. 2) is changed, since a rotation of the shaft input of the turret position transformer occurs. As shown, the output of turret position transformer 201 is fed to one input of phase detector 400, and the output of control transformer 404 is fed to the other input of phase detector 400. An error signal is generated at the output of phase detector 400 due to the phase difference, and this error signal is amplified by servo amp 401 to drive AC motor 402. Via gearing 403, the phase of the output of control transformer 404 is brought into conformity with the phase of the output of turret position transformer 201.

Gearing 403 is connected directly to the fiducal ring 406 of indicator 405. Thus, rotation of gearing 403 causes fiducal ring 406 to move to display the position of the gun with respect to magnetic north. Such display may be conveniently effected by employing a marker 407 on fiducal ring 406.

The foregoing description of the present invention has been made to comply with the requirements of the Patent Statute. Those skilled in the art, having the benefit of the present disclosure, will likely be able to modify the disclosed apparatus to operate in substantially the same manner to produce substantially the same results as the disclosed apparatus. The appended claims are intended to cover all such modifications.

I claim:

1. A magnetic heading indicator system for use in a vehicle having a body and having a turret which is rotatable with respect to said body, said system comprising:
   a magnetic heading indicator which is mounted inside the body of the vehicle for indicating the magnetic heading of the vehicle;
   a transmitter which is mounted on the turret of the vehicle so that substantially all of the magnetic signature of the vehicle is below the transmitter, which transmitter operates: (i) to produce heading information to the indicator indicative of the magnetic heading of the vehicle; and (ii) to prevent changes in said heading information due to turret rotation.

2. The transmitter of claim 1, wherein it further comprises means for compensating the transmitter for the effects of the magnetic signature of the vehicle.

3. The transmitter of claim 2, wherein the sensing means include a magnet and wherein the compensation means include a pair of balls of magnetic material, which balls are disposed in the same azimuth plane as the sensing magnet.

4. A transmitter for use in a vehicle including a body, a turret which is mounted on the body and which rotates independently of the body, and a magnetic heading indicator in the body of the vehicle for displaying the magnetic heading of the vehicle, which transmitter is mounted on the turret of the vehicle so that substantially all of the magnetic signature of the vehicle is below the transmitter and which transmitter comprises:
   (a) sensing means disposed in the transmitter for producing heading information to the magnetic heading indicator indicative of the magnetic heading of the vehicle.
   (b) means for detecting rotation of the turret of the vehicle; and
   (c) means for preventing a change in said heading information based on turret rotation.

5. The transmitter of claim 4, wherein the sensing means includes a winding which is continuously maintained in alignment with the heading of the vehicle.

6. The transmitter of claim 5, wherein the sensing means include a movable magnet disposed in said winding to sense the north-south flux lines of the earth.

7. The transmitter of claim 6, wherein the winding comprises a delta winding and wherein the movable magnet is disposed in the center of the delta winding.

8. The transmitter of claim 5, wherein the means for adjusting the alignment of the winding comprises:
   (a) means for producing an error signal responsive to rotation of the turret; and
   (b) means for nullifying the error signal, while maintaining the winding aligned with the heading of the body of the tank.

9. The transmitter of claim 8, wherein the means for producing an error signal comprise:
   (a) means responsive to the rotation of the azimuth ring of the vehicle for producing a first signal;
   (b) means for producing a reference signal; and
   (c) means for comparing the phases of the first and reference signals and for producing an error signal when the phases do not compare.

10. The transmitter of claim 9, wherein the detection means include means for adjusting the phase of the reference signal responsive to the error signal until the phases of the first and reference signals compare and for simultaneously maintaining the winding aligned with the heading of the vehicle.

11. A gun position indicator system for use in a vehicle having a body, a turret which is rotatable with respect to said body, the turret including a gun and means for positioning the gun in a given direction, said system comprising:
   an indicator which is mounted inside the vehicle for displaying the direction of the gun with respect to magnetic north; and
   a transmitter which is mounted on the turret so that substantially all of the magnetic signature of the vehicle is below the transmitter and which operates to produce gun control signals to the indicator when the vehicle assumes a new heading, which gun control signals cause the indicator to display the new direction of the gun with respect to magnetic north.

12. The apparatus of claim 11, wherein the gun control means comprise:
   (a) means for detecting rotation of the turret of the vehicle; and
   (b) means responsive to turret rotation for changing the position of the gun with respect to the body of the vehicle.

* * * * *

UNITED STATES PATENT AND TRADEMARK OFFICE
CERTIFICATE OF CORRECTION

PATENT NO. : 4,358,985
DATED : November 16, 1982
INVENTOR(S) : Leslie A. Hamilton It is certified that error appears in the above-identified patent and that said Letters Patent are hereby corrected as shown below:

Column 3, line 24, delete "cut" and insert --cup--.

Column 3, line 30, delete "cut" and insert --cup--.

Signed and Sealed this

Seventeenth Day of July 1984

[SEAL]

Attest:

GERALD J. MOSSINGHOFF

Attesting Officer          Commissioner of Patents and Trademarks